United States Patent [19]

Kulkarni

[11] Patent Number: 5,216,573
[45] Date of Patent: Jun. 1, 1993

[54] LEAD FILLED CERAMIC CAPACITOR AND METHOD OF MAKING SAME

[75] Inventor: Sudhir Kulkarni, Myrtle Beach, S.C.
[73] Assignee: AVX Corporation, New York, N.Y.
[21] Appl. No.: 933,237
[22] Filed: Aug. 21, 1992
[51] Int. Cl.[5] .................. H01G 4/10; H01G 4/30; H01G 7/00
[52] U.S. Cl. .................. 361/321; 29/25.42; 264/61
[58] Field of Search ............... 29/25.42; 361/320, 321, 361/308–310, 328, 329; 264/61

[56] References Cited

U.S. PATENT DOCUMENTS

| | | | |
|---|---|---|---|
| 3,679,950 | 7/1972 | Rutt | 361/321 |
| 4,584,629 | 4/1986 | Garcia et al. | 361/321 |
| 4,881,308 | 11/1989 | McLaughlin et al. | 29/25.42 |
| 5,021,921 | 6/1991 | Sano et al. | 361/321 |

Primary Examiner—Donald A. Griffin
Attorney, Agent, or Firm—Mark T. Basseches

[57] ABSTRACT

A method for manufacturing ceramic capacitors of the lead filled type comprises coating the end surfaces of a ceramic monolith having internal voids opening to the ends with a termination paste. The paste includes glass frit, a metal component wettable by lead, i.e. silver, binder and solvent, the characterizing feature of the paste being the inclusion of reducible metal salts of a metal wettable by lead, the salts undergoing volumetric diminution when reduced from the salt to the metallic state. When the termination paste is sintered, reduction of the metallic salt provides the termination with a porous latticework. Molten lead or lead alloys are injected through the now porous, sintered termination paste. The disclosure further relates to a capacitor made in accordance with the method described.

12 Claims, 2 Drawing Sheets

LEAD FILLED CERAMIC CAPACITOR AND METHOD OF MAKING SAME

BACKGROUND OF THE INVENTION

The present invention is directed to a method of manufacturing ceramic capacitors of the lead filled type and to the resultant capacitor. More particularly, the invention is directed to the solution of an industry wide problem encountered in lead filled type ceramic capacitors, namely the predictable introduction of lead into the interiors of the ceramic monoliths and the effective termination of the resultant capacitors.

THE PRIOR ART

The conventional method for manufacturing ceramic capacitors comprises forming thin sheets of green ceramic, imprinting the sheets with electroding ink, stacking a multiplicity of such sheets, and thereafter sintering to form a ceramic monolith having intervening electrode layers. The capacitors manufactured by this method require the use of metallic components in the electroding material which are resistant to the high temperatures of sintering. The known metals useful for such purpose include noble metals, such as platinum and palladium, materials which are extremely costly.

In order to avoid using noble metals a method of manufacturing ceramic capacitors has been developed which involves forming sintered monoliths of ceramic having void areas where the electrodes are to be disposed. The voids are subsequently filled with molten lead or lead alloys which define the electrodes. Thereafter terminations are applied at the ends of the void areas to contact the lead filling and provide terminations for the capacitors. Representative examples for the so-called lead filled capacitors are found in U.S. Pat. Nos. 3,679,950, 3,879,645, 3,965,552 and others.

Capacitors of the lead filled type, while substantially less costly than the noble metal type capacitors, engender significant problems in their manufacture. Once such problem arises from the tendency of molten metal which is forced into the void areas to immediately run out of the voids totally or in part as soon as the ceramic members are removed from the pressurized molten lead bath.

One proposed means of solving the lead run out problem involves coating the ends of the ceramic prior to filling with a frit and forcing the lead through the frit into the void areas. If the frit is dense and of limited porosity it is difficult to insure total filling of the void areas with the result that the capacitance of the resultant device is unpredictable. Also, the use of dense frit as a means of constraining lead requires that portions of the frit be ground away to provide contact areas with the buried electrodes.

The use of a highly porous pure frit fails to solve the lead run out problem. In order to minimize run out it has been proposed to incorporate increments of silver in the frit, the silver functioning to wet to the injected lead and minimize run out. The problem with the use of frit-silver end barriers is that the lead tends to dissolve and leach the silver from the frit whereby the end barriers are not sufficiently conductive to permit the application of terminations on the exterior surfaces, again necessitating grinding away of all or part of the barriers.

Subsequent attempts at solving the noted problems involve the use in the frit of a mixture of silver and nickel. Since the liquid silver and nickel are immiscible there are provided passages through the frit facilitating introduction of the lead. A drawback of this method is that the silver is leached and the bond between injected lead and the remaining nickel, as well as the bond between the remaining nickel and solder outer coating employed for termination, is weak with the result that the applied external terminations peal readily from the ends of the device, thus exhibiting low pull strength.

A further proposed solution to the noted problem is addressed by U.S. Pat. No. 4,881,308 owned by the assignee of the instant application. In accordance with the method of the noted patent, particles of an oxidizable metal such as copper or silver are incorporated in the barrier frit composition and are processed in an oxidizing environment with the result that the metal components adjacent the exterior of the fused barriers are oxidized, whereas the metal at the interior portions remain unoxidized or only slightly oxidized. The resultant capacitor preforms may be filled with lead, lead run out being minimized by wetting to the interior or unoxidized metal components.

The noted method has the advantage that only minimal quantities of lead will adhere to the external surfaces of the barriers due to the presence of oxides, whereby a processed batch of capacitors may be readily separated one from the other. This is in contrast to capacitors wherein large quantities of lead adhere to the exterior of the barriers thereby rendering separation of individual capacitors one from the other difficult due to lead bonding between adjacent capacitors.

Other patents located in a search of the prior art and relating to some degree to the described problem include British application No. 2119571A and European patent application No. 0092912 which facilitate termination by applying a coarse frit to the ends of the ceramic body, the frit being comprised of glass particles coated with silver and overcoated with silver sulfide. Injected lead wets to the silver sulfide minimizing leaching of the silver by the injected lead.

4,071,878 discloses a lead filled capacitor having holes formed perpendicular to the electrode voids. Wires are placed in the holes and the capacitors are immersed in lead to fill the electrode voids by passing lead around the wires. The wires form the input terminals to the capacitor.

4,313,259 disclosures an electrochemical cell incorporating a perforate conductive coating containing electrochemically active material.

4,731,695 discloses a thin film capacitor employing a vapor deposited dielectric layer any cracks or pores whereof are sealed by a fill dielectric.

5,021,921 discloses a conventional (palladium electrode) ceramic capacitor whereby termination is said to be improved by adding semi-conductive material between the ends of the electrode layers and the outermost ends of the capacitor.

SUMMARY OF THE INVENTION

The invention may be summarized as directed to an improved method of fabricating capacitors of the lead filled type and to the resultant capacitors.

More particularly, the invention is directed to a method wherein a ceramic monolith having interior voids for reception of lead filled electrodes is coated on its end surfaces with a porous semi-barrier, including glass frit, a metal such as silver, and characterized in that as a component of the frit there is included a reducible salt of a metal selected from the group of silver, gold and lead and indium. The salt is selected to be reducible to the pure metallic state under the termination firing conditions and to be of a significantly lower volume when reduced to its metallic state than was occupied by the salt in its combined state.

A preferred example of such a composition is silver-oxide. The frit composition is sintered to define a barrier, the sintering step also functioning to reduce the salt to its pure metallic state. As a result of the volumetric diminution resulting from such reduction, there are created pores through which molten lead may readily flow. By virtue of the increased porosity, lead is flowed more rapidly and readily into the interior void areas and wets to the metallic components of the frit. The resultant filled capacitors provide a low conductivity path from the exterior of the barrier layers to the electrodes.

A thin adherent lead coating remains on the exterior of the barriers, which coating is readily receptive to solder or like termination material. Leaching of the silver component from the termination barrier layers, while present to a degree, is substantially less than would be the case in the absence of the reducible salts which are subsequently reduced to the pure metal Without limitation and without tending to be bound thereto, it is theorized that the presence of the reducible salts which are subsequently reduced to the pure metallic form functions to provide termination barriers having an ideal porosity, namely not so dense that the lead composition cannot readily be forced into the interior of the voids, and not so porous that the silver or like metal components of the terminations are readily leached from the termination layers.

In is accordingly an object of the invention to provide an improved method of forming lead filled type ceramic capacitors as well as an improved ceramic capacitor of the lead filled type.

BRIEF DESCRIPTION OF DRAWINGS

The drawings, which are schematic in nature, include.

DETAILED DESCRIPTION OF THE DRAWINGS

Figure 1:
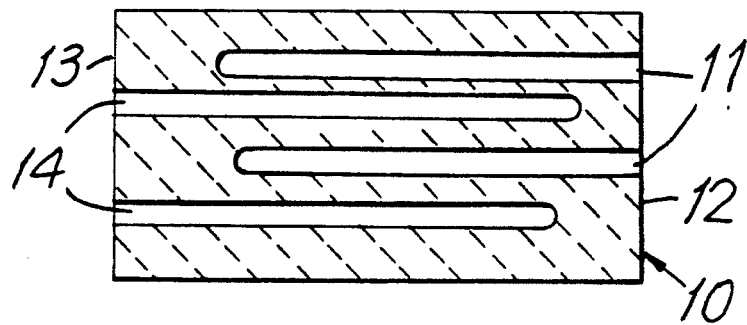
FIG. 1, a sectional view through a ceramic monolith.

In accordance with the invention there is shown in FIG.1 a ceramic monolith 10 known per se and fabricated, for example, in accordance with the procedures set forth in U.S. U.S. Pat. No. 3,965,552.

By way of example, the ceramic body member 10 includes void areas 11 extending from end 12 of the monolith part way toward but terminating short of the opposite end 13. A series of void areas 14 extend from end 13 part way toward end 12. As is well known, the void areas 12 and 14 will be filled with lead or a lead alloy, and when thus filled will define the electrodes of the capacitor.

Figure 2:
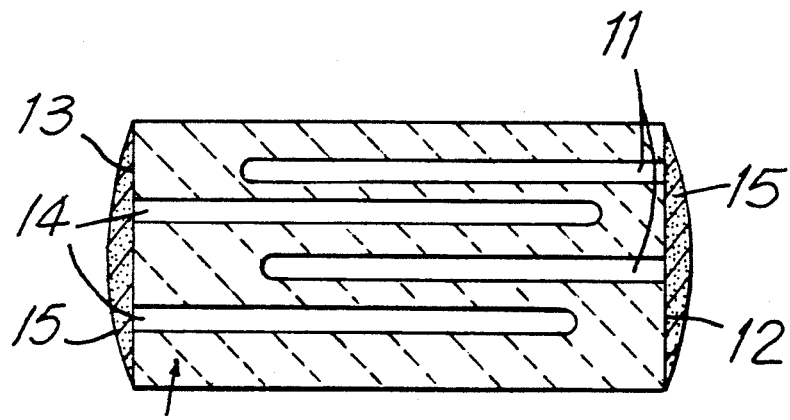
FIG. 2, a sectional view similar to FIG. 1 after application paste to the ends of the monolith.

In FIG. 2 the monolith 10 is treated by coating the end portions 12-13 with layers of termination paste 15.

The composition of the termination paste will be described in detail hereinafter, but generally includes a low melting glass frit powder, particulate metallic material, i.e. silver, binder and solvent to form a paste, and a reducible metallic salt characterized in that when the salt is reduced to the metallic state the volume occupied by the particulate salt is significantly diminished.

Figure 2A:
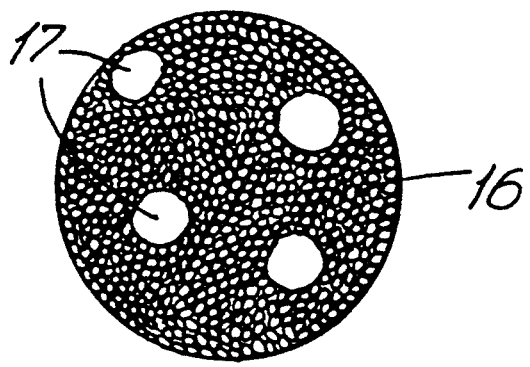
FIG. 2a, an enlarged sectional view through the termination paste.

Referring now to FIG. 2a there is schematically disclosed a section of termination paste on a highly magnified scale, the paste including particulate masses of glass and metal, i.e. silver, both such particles being identified with the reference numeral 16, as well as particles 17 being reducible salts of metals compatible with and subject to being wetted by the lead-lead alloy used to fill the voids 11-14.

Figure 3:
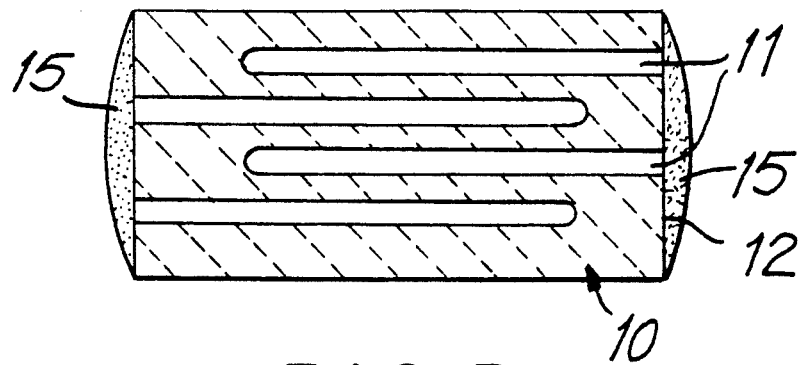
FIG. 3, a sectional view of the monolith after the termination paste has been sintered.
Figure 3A:
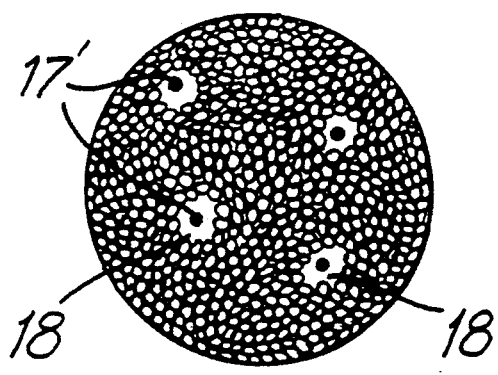
FIG. 3a, magnified view of a section of the termination area following sintering.

In FIG. 3 the termination or barrier layers 15 have been sintered, FIG. 3a being a schematic and greatly magnified sectional view of the portion of the sintered barriers. As shown in FIG. 3a reference numerals 17 represent metallic components resulting from reduction of the salts of such components present in the unsintered termination paste.

As will be apparent from FIG. 3a the volumetric diminution of the salt particles 17 has resulted in the formation of a series of void areas 18, which void areas define a porous mesh work through the depths of termination layers 15.

Figure 4:
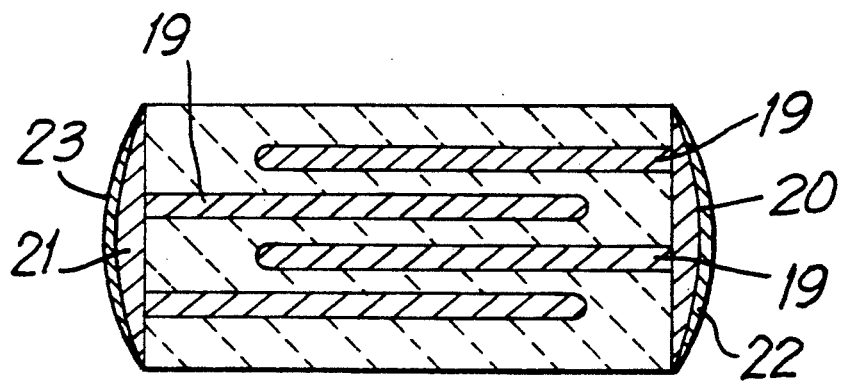
FIG. 4, a sectional view of the finished capacitor.

In FIG. 4 there is illustrated the finished capacitor, a filling 19 of lead or lead alloy having been injected into the interior of the voids 11 and 14 by immersion of the monoliths of FIG. 3 in a molten and pressurized lead bath. In the course of such filling, it will be appreciated that a controlled leaching of the metallic components forming a principal ingredient of the termination paste will have taken place. However, electrical continuity between the electrodes and external surfaces 20-21 of the sintered termination layers is assured, the porous frit including sufficient conductive lead and remnants of metal components of the termination paste to provide the necessarily electrical connections.

In addition, the surfaces 20-21 will carry a thin lead-lead alloy coating from the filling bath, which coating is firmly bonded to the body of the monolith. The coatings 22-23 are readily receptive to further soldered connections for the attachment of leads to the capacitors, which leads will exhibit a high pull strength attachment to the capacitor body.

DETAILED DESCRIPTION OF METHOD

To the end portions 12-13 of series of sintered ceramic monoliths made, for example, in accordance with the procedures set forth in U.S. Pat. No. 3,965,552, there is applied a layer of barrier-termination paste 15. By way of example and in compliance with the "best mode" requirements of the patent laws, there is noted below a preferred termination paste formulation.

| Termination Paste | |
|---|---|
| Vehicle System | 15 to 25% |
| Silver | 50 to 70% |
| Frit | 4 to 8% |
| Silver Oxide | 5 to 15% |
| Dispersant | .5 to 2% |

A preferred vehicle system (solvent and binder) is formulated as follows:

| | | |
|---|---|---|
| Binder | (½ ethyl cellulose and ½ phenolic resin) | 26% |
| Solvent | (terpineol 52%; dibutyl carbitol 48%) | 71.4% |
| Plasticizer | (dioctyl phthalate) | 2.6% |

The glass frit (average particle size 3.0 micrometers) has a softening point at 650 degrees C.

A preferred paste formulation comprises 19.2% vehicle system; 60.27% silver; 5.92% frit; 9.06% silver oxide; 1.2% dispersant (dibutyl carbitol balance solvent to 100%).

Other salts useful in the formulation as substitutes for silver includes oxides, nitrides and/or carbonates of silver, lead, gold or combinations thereof. Likewise, others of the noted metals may be substituted for the silver component.

Additional metals and salts may be found suitable, the critical factors being that the selected metal be wettable by the lead or lead silver, or lead/tin alloy used as a filler to form the internal electrodes, that the selected salt of the metal be subject to significant volumetric diminution when reduced to the metallic state, and that the salt be readily reducible.

MANUFACTURING PROCEDURE

A termination paste as described was spread on a flat sheet to a thickness from about 10 to 20 micrometers and each edge (12-13) of the ceramic preform was immersed to a depth of about 10 to 18 micrometers. The chips were withdrawn from the mix, dried at 160 degrees C for 15 minutes and thereafter sintered at a temperature in the range of 780 degrees to 860 degrees C for 20 minutes resulting in a sintered layer at each end of the chips.

Microscopic examination of the sintered layer revealed the presence of porous passages through the coatings, the porosity being attributed to the fact that the oxide components of the termination paste were reduced to pure metallic substance, the metallic substances occupying lesser volume than the oxides thereof.

The treated chips were immersed in a molten alloy comprised of lead, tin and silver (percentages not critical) at a temperature of approximately 450 degrees C under pressure of 2 to 5 atmospheres for a period of about 3 minutes. The filled chips are withdrawn from the molten bath and while still remaining in a pressurized environment are jogged in a basket, so as to remove excess molten material adhering to the ends of the capacitors and separate the capacitors one from the other. The jog cycle is continued for approximately 1 minute, the capacitors being subjected to approximately 220 to 350 jogging strokes during this time period. After about 35 seconds of jogging under pressure the pressure is slowly released as the jogging continues.

The resulting capacitors are cooled and further terminations are applied in accordance with the intended end use of the capacitor. Various known alternatives such as the addition of a solder layer over the thin layer of lead remaining at the ends of the capacitors following jogging, and plating over the thin lead layers with nickel represent satisfactory alternatives.

The processing steps following sintering of the termination layers, i.e. immersion in lead bath, jogging, etc., are conventional and well known in the art.

As known in the art, the idealized parameters for lead fill, jogging and the like, are best derived as a result of trial and error. For example, fill time within the lead bath may be varied as a function of the dimension of the voids within the ceramic monoliths, and jog time may be adjusted in accordance with the size of the capacitor chips being processed.

It should be appreciated that the formulations and processing parameters specifically set forth hereinabove are incorporated herein merely as representative examples, it being understood that numerous variations both by way of formulation and processing will readily occur to those skilled in the art and familiarized with the instant disclosure.

The essential novelty of the instant invention is considered to reside in the inclusion within barrier forming coatings disposed at the ends of the ceramic monolith of a frit which incorporates a metal component wettable by the injected lead in combination with a reducible metallic salt, which salt, when reduced to its metallic state, occupies a significantly smaller volume thereby providing a porosity or meshwork within the barrier facilitating the lead injection and enabling the inevitable leaching by the lead of the soluble metal components in the bath to be controlled to a degree not heretofore possible.

The invention is to, be broadly construed within the scope of the appended claims.

Having thus described the invention and illustrated its use, what is claimed as new and is desired to be secured by Letters Patent is:

1. The method of manufacturing a ceramic capacitor comprising providing a ceramic monolith having a plurality of electrode receiving voids, alternate said voids extending to opposite ends of the monolith, coating said ends of said monolith with a layer of termination paste comprised of a fusible frit and a reducible salt of a metal selected from one or more of the group consisting of silver, gold, lead and indium, said salt being subject to volumetric diminution when reduced to the metallic state, sintering said layers to fuse said frit and to cause said salt to be reduced to the metallic state to thereby render said layers porous as a result of the volumetric reduction of said salts, and thereafter injecting a molten metal comprising lead into the interior of said voids through said porous layer.

2. The method of claim 1 and including the step of applying conductive terminations to the exterior surfaces of said layers following said injection step.

3. The method of claim 1, wherein said termination paste includes metallic silver.

4. The method of claim 1, wherein said termination paste comprises (by weight) 50 to 75% metallic silver; 4 to 8% glass frit; 5 to 15% reducible salts; and 15 to 25% of a carrier comprised of solvents and a binder.

5. The method of claim 1, wherein said reducible salt is comprised of silver oxide in the range of from about 5 to 15% by weight of said termination paste.

6. The method of claim 1, wherein the salt is selected from the group consisting of oxides, nitrides, and carbonates.

7. A capacitor manufactured by the method of providing a ceramic monolith having a plurality of electrode receiving voids, alternate said voids extending to opposite ends of the monolith, coating said ends of said monolith with a termination paste layer comprised of fusible glass frit and a reducible salt of a metal selected from one or more of the group consisting of silver, gold, lead and indium, said salt being characterized by volumetric diminution when reduced to the metallic state thereof, sintering said layers to fuse said frit and reduce said salt to the metallic state thereof to thereby augment the porosity of said layer as a result of the shrinkage of said salt, thereafter injecting a molten metal comprising lead into the interior of said voids through said porous layers, and thereafter applying conductive metallic terminations to the external surfaces of said layers.

8. A capacitor in accordance with claim 7, wherein said salt is selected from a group consisting of oxides, nitrides, and carbonates.

9. A capacitor in accordance with claim 7, wherein said paste includes metallic silver.

10. A capacitor in accordance with claim 7, wherein said termination paste comprises by weight 50 to 75% silver, 4 to 8% frit, 5 to 15% reducible salts, and 15 to 25% of a carrier comprised of solvents and binder.

11. A capacitor in accordance with claim 7, wherein said reducible salt is comprised of silver oxide in the range of from about 5 to 15% by weight of said termination paste.

12. The method of manufacturing a ceramic capacitor comprising providing a ceramic monolith having a plurality of electrode receiving voids, alternate said voids extending to opposite ends of the monolith, coating said ends of said monolith with a layer of termination paste comprised of a fusible frit and a reducible salt of a metal subject to volumetric diminution when reduced to the metallic state and subject to reduction under sintering conditions of said frit, sintering said layers to fuse said frit and to cause said salt to be reduced to the metallic state to thereby render said layers porous as a result of the volumetric reduction of said salts, and thereafter injecting a molten metal comprising lead into the interior of said voids through said porous layer.

* * * * *